United States Patent [19]

Schmoyer

[11] 3,954,040

[45] May 4, 1976

[54] SYSTEM AND APPARATUS FOR KEYBOARD INSTRUCTION IN PLAYING CHORDS IN 3-4 OR 4-4 TIME

[76] Inventor: Arthur R. Schmoyer, Rte. 16, Woolford, Md. 21677

[22] Filed: May 16, 1975

[21] Appl. No.: 578,032

[52] U.S. Cl. .............................................. 84/478
[51] Int. Cl.² ........................................ G09B 15/08
[58] Field of Search ............. 84/478, 470, 483, 484, 84/485

[56] References Cited
UNITED STATES PATENTS

| | | | |
|---|---|---|---|
| 3,335,630 | 8/1967 | Schmoyer | 84/478 |
| 3,503,296 | 3/1970 | Schmoyer et al. | 84/478 |
| 3,503,297 | 3/1970 | Schmoyer et al. | 84/478 |
| 3,897,710 | 8/1975 | Schmoyer | 84/478 |

*Primary Examiner*—Stephen J. Tomsky
*Attorney, Agent, or Firm*—Gardiner, Sixbey, Bradford & Carlson

[57] ABSTRACT

A system for instruction in the manipulation of the chord portion of a keyboard of a musical instrument in 3-4 or 4-4 time includes uniquely written music which provides a student with an identity of the root note of each chord to be played and the timing (but not necessarily the identity) of the corresponding chord triad to follow the root note. In conjunction with the music, an apparatus senses the depression of the root note key by the student, provides a sustained confirming identification of that note, and provides the identity (but not the timing) of the triad notes. The indication is retained until a different note key is depressed. The apparatus is useful independently of the written music or keyboard instrument to demonstrate the 5-2-1 system of fingering chords as set forth in U.S. Pat. No. 3,335,630.

10 Claims, 6 Drawing Figures

SYSTEM AND APPARATUS FOR KEYBOARD INSTRUCTION IN PLAYING CHORDS IN 3-4 OR 4-4 TIME

ENVIRONMENT OF INVENTION

This invention relates generally to the field of instructional apparatus and methods for instruction in the operation of a keyboard musical instrument, particularly a piano, and specifically to that apparatus and a method which instructs in the sounding of chords in 3/4 and 4/4 time.

BACKGROUND OF INVENTION - PRIOR ART

In my U.S. Pat. No. 3,335,630 issued Aug. 15, 1967, I describe a visual chord teaching device in which indicators visually associated with individual keys of a keyboard are controlled so as to provide an indication of a triad of keys to be manipulated in sounding a chord. These indicators are activated in response to the depression of the clavial pedal which sounds the root note of the desired triad. The device is particularly adapted to teaching the sounding of sustained chord notes as in commonly employed in playing an organ.

In my later U.S. Pat. Nos. 3,503,296 and 3,503,297, both issued Mar. 31, 1970, similar indications are obtained in response to the sounding of the root note key on the same portion of the keyboard upon which the chord is to be sounded. Again, the system is primarily directed to instruction in the sounding of sustained note chords.

Also in my U.S. Pat. No. 3,335,630 there is described a technique of fingering keys in playing chord triads identified as the 5-2-1 system.

OBJECTS OF INVENTION

In contradistinction to my aforementioned patent disclosures, this invention addresses itself particularly to the objective of instruction in the sounding of chords in common 4/4, or march time, in 3/4, or waltz time, or others, e.g., 6/8 time etc., wherein a root note is sounded momentarily, followed by one or more soundings of the corresponding triad in a different octave. This, and other objectives of this invention, may be set forth as the provision of a system for instruction in the playing of a keyboard musical instrument wherein;

1. the student is required to ascertain the root identity of the chord to be sounded and only the timing (i.e., 3/4 or 4/4 time) of the triad notes from instructional sheet music,
2. upon playing the root note, the student is provided with visual identifiers of the triad,
3. the apparatus relies on the student's determination of time and hence may be used with different time signatures without modification or change of mode,
4. the manner of use of the apparatus is extremely simple,
5. the unit is self-contained in a compact mechanism usable without modification of the musical instrument,
6. the unit is particularly useful in conjunction with music notations comprising an ordered relationship to root note indicia and triad timing symbols, and
7. the unit is usable independently of the notations on the keyboard to demonstrate a unique system of fingering of chord triads.

DESCRIPTION OF DRAWINGS

These and other self-evident objectives and advantages of this invention will be better understood by a consideration of the ensuing specification and accompanying drawings, in which.

GENERAL DESCRIPTION OF THE APPARATUS

Figure 1:
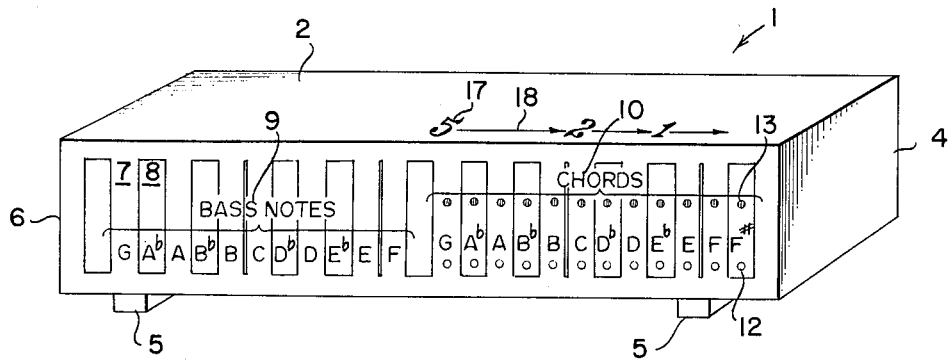
FIG. 1 is a perspective view of the apparatus of this invention.
Figure 2:
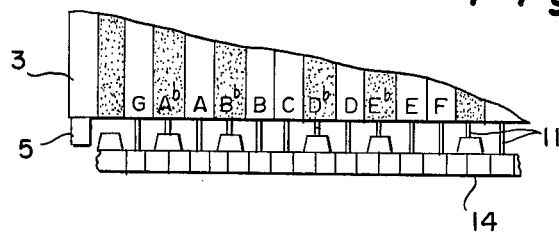
FIG. 2 is an elevational view of a segment of the apparatus of FIG. 1

Referring to FIG. 1, the apparatus of this invention includes components mounted within mounting means comprising an enclosure generally indicated at 1 and including top 2, sides 3 and 4, a back (not shown), and appropriate support elements 5 for supporting the enclosure on a piano keyboard.

The enclosure includes a front face 6 which comprises a display panel having keyboard indicia thereon. The indicia includes key symbols 7 for white keys and symbols 8 for black keys. The symbols are categorized as bass notes, as at 9, and chord notes, as at 10. The apparatus is provided with sensors including actuators 11 underlying each symbol identifying a bass note, each said actuator being engageable with the top surface of a key 14 underlying the respective symbol and sensitive to the depression of the particular key to provide an electrical signal, hereinafter referred to as a bass note signal.

The display panel is further provided with indicators, each of which is associated with a particular chord note symbol. As shown in FIG. 1, these indicators include on set of chord triad identifier lights 12 and may optionally include a set of root note confirmation lights 13. Preferably, the chord triad identifier lights are placed low on the symbol where they are in close visual association with the keyboard upon which the device is placed. On the other hand, the root note confirmation lights, if employed, are for the purpose of confirming manipulation of the proper root note for the chord generally and appropriately are positioned in a more remote position, as visual association with the triad octave keys is of lesser importance. In the display panel of FIG. 1, this position is in the upper portion of the panel. The triad identifiers are preferably more distinct than the root note indicator, as by using clear, white or yellow lenses whereas the root note indicators are colored, although the reverse order is equally applicable.

METHOD OF INSTRUCTION EMPLOYING THE APPARATUS

Figure 3:
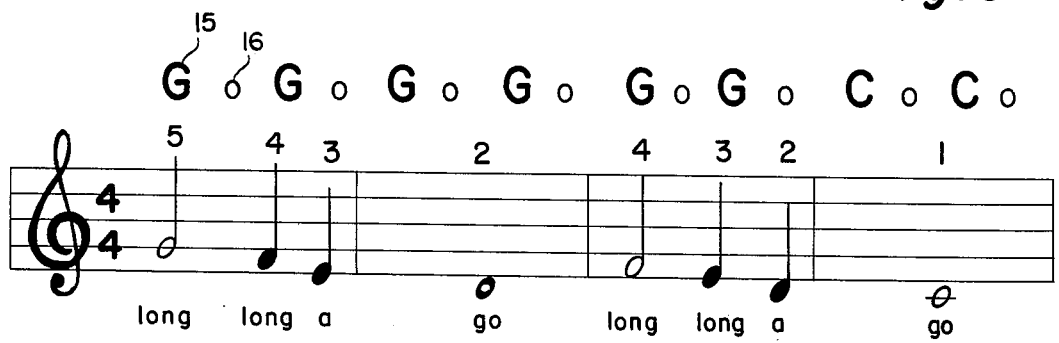
FIGS. 3 & 4 are reproductions of a portion of instructional sheets for use with the apparatus.
Figure 4:
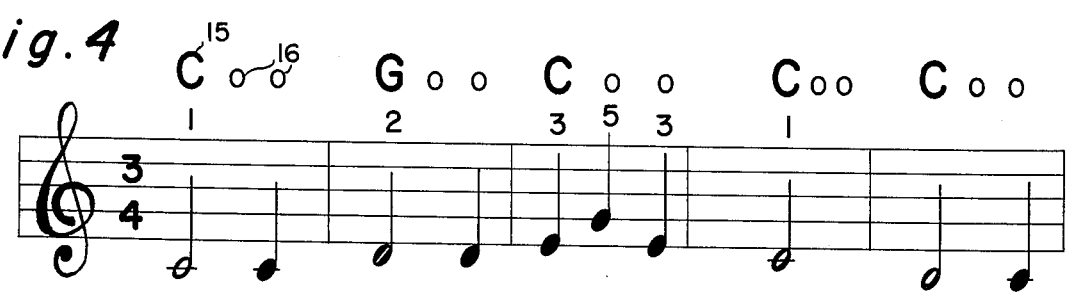

Attention is invited to FIGS. 3 and 4 which disclose excerpts from instructional music sheets prepared for use with the aforedescribed apparatus. FIG. 3 represents four bars from a piece of music having a time signature in 4/4 time, whereas FIG. 4 represents a piece of 3/4 time. In each instance, the melody is depicted basically in conventional style, with the addition of the numerals above each note which correspond to the student's fingers in a manner set forth in the aforementioned U.S. Pat. No. 3,335,630 pertaining to the 5-2-1 system of fingering. Above the numerals are placed a series of bass note indentifications 15 interspaced in ordered relationship with chord triad timing symbols 16, the latter being shown as a small circle. Of course, other symbols could be used, it being preferable that the configuration avoid confusion with the conventional note symbols. In the 4/4 time music of FIG. 3, the sequence for two consecutive bars is;

NOTE IDENT.-SYMBOL-NOTE IDENT.-SYMBOL, whereas in the ¾ time of FIG. 4, the sequence is

NOTE IDENT.-SYMBOL-SYMBOL-NOTE IDENT.-SYMBOL-SYMBOL.

In use, the enclosure 1 is placed on the musical instrument keyboard in appropriate registry with keys in the lower octaves below middle C so that the actuators 11 register with keys of a first octave and the identifiers are disposed directly over and thus in visual association with respective keys of a second octave. A student desiring to play accompaniment to the melody of FIG. 3 will, commencing with the first bar of that Figure, refer to the note identification above the first note and ascertain that the root note G is to be sounded. Upon depressing the G key in the bass octave, triad identifier lights 12 for the notes of the triad, namely G, B and D are illuminated and are latched to remain illuminated by means to be described in the ensuing specification relating to the electronic circuitry. The student, continuing his reference to the music of FIG. 3, ascertains from the chord symbol 16 following the base note the timing at which a chord is to be sounded, the latched on triad identifier lights 12 advising him that the identity of the notes to be played are G, B and D. After sounding the triad G, B and D, he ascertains from the music sheet that the base note G is to be sounded as the third beat of the first bar. Inasmuch as the same bass note-chord triad is being repeated, the triad identifier lights 12 remain latched to indicate that the same triad follows on the last beat of the first bar. The same sequence is followed for the second and third bars of that staff, both of which are also accompanied by the G chord. Upon reaching the fourth bar, however, the student is instructed by the bass note designation to play the bass note C. Upon depressing the key 14 for C in the bass octave, the triad identifier lights 12 for G, B and D are extinguished by release of the latching means, again in a manner yet to be described. At the same time, the triad identifier lights for the C chord are illuminated and latched on in the same manner as G chord previously. Again, the triad identifier lights remain illuminated until there is a change in the bass note which is depressed on the keyboard.

The apparatus functions electrically in precisely the same manner whether used in 4/4 time as just described, or in ¾ time in a manner now to be described in connection with FIG. 4. No changes need be made in the apparatus itself.

In the instance of FIG. 4, the student is apprised by reference to the music sheet that the three beats of the first bar consist of the bass note of C, followed by two chord triads. Upon depression of the bass note C, chord identifier lights C, E and G are illuminated and are latched in the illuminated state. The student then sounds two beats of the triad C, E and G in order to complete rendition of the first bar, the same lights remaining illuminated. Passing to the second bar, the student ascertains from the music sheet that the bar consists of the bass note G followed again, of course, by two chord triad beats. As the bass key of G is depressed on the first beat, the chord triad identifiers C, E, and G are extinguished and the triad identifiers G, B, and D are illuminated to signify the changed triad to be sounded on the second and third beats. The procedure is repeated for each bar.

In a preferred embodiment employing root note confirmatory lights 13, the appropriate light 13 is illuminated in response to depression of the bass note key, this indicating the root designation of the triad which is to follow. The root note confirmatory light 13 remains "ON" until a different root note key is depressed.

The latter embodiment has utility above and beyond its use in the aforedescribed manner. This utility is as a demonstration display means or visual aid to the explanation of fingering techniques in accordance with the 5-2-1 system of instruction. The 5-2-1 system of instruction is described in my U.S. Pat. No. 3,335,630. As set forth therein, a chord in the fundamental or root mode is identified by the lowermost note of the triad (the root note), the key of which is manipulated by the little finger (identified as finger no. 5). In the case of the second inversion, the chord is identified by the middle note or the triad, hence is played by the fore finger (identified as finger no. 2) and in the first inversion by the thumb (identified as finger no. 1).

To the end that this apparatus can be readily employed as a visual aid in explaining this fingering, the unit is provided with the numerals 5, 2, and 1 appropriately associated with the display panel. Appropriately, the numeral 5 shown at 17 placed above the chord identifier light 13 for the key G with an accompanying indication such as arrow 18 to show that triads for the root notes G thru B are in the root mode, and hence the root note is to be played with the fifth finger, the other notes being upscale of the root note.

Similarly, the numeral 2 is associated with the group of keys C thru D to indicate the identification of second inversion noted by the middle note, from which the other two notes appear respectively downwardly and upwardly on the scale and which is played by the number 2 finger. Lastly, keys E flat thru F sharp, identified by the numeral 1, indicate first inversion traids in which the root note is played by the number 1 finger and the balance of the traid notes appear downwardly therefrom on the scale.

The applicability of the unit as a visual aid to instruction in this technique is particularly vivid as one successively activates the unit through a scale of triads. This activation can be done on the keyboard as aforedescribed, independently of the keyboard by simply manually manipulating the actuators 11, or could be accomplished on a classroom scale by a display including other actuators such as conventional switches or pushbuttons of conventional form (not shown) which may be remote from the display itself. As the triads are successively activated, a pattern of successive light indications developes which is illustrated in the following truth table in which asterisks indicate chord confirmation lights and circles indicate chord note identifiers:

| G | A♭ | A | B♭ | B | C | D♭ | D | E♭ | E | F | F# |
|---|----|---|----|---|---|----|---|----|---|---|----|
| * |    |   |    | o |   |    | o |    |   |   |    |
| o | *  |   |    |   | o |    |   | o  |   |   |    |
|   |    | * |    |   |   | o  |   |    | o |   |    |
|   |    |   | ó  |   |   |    | o |    |   | o |    |

-continued

| G | A♭ | A | B♭ | B | C | D♭ | D | E♭ | E | F | F# |
|---|----|---|----|---|---|----|---|----|---|---|----|
| O |    |   |    | *O |   | *O |   |    | O |   |    |
|   | O  |   |    |   |   |    | *O |    |   | O |    |
| O |    |   | O  |   |   |    |   | *O | *O |   |    |
|   | O  |   |    |   | O |    |   |    |   | *O |    |
|   |    | O |    |   |   | O  |   |    |   |   | *O |

It is recognized that the display of FIG. 7 of my U.S. Pat. No. 3,335,630 includes provision for distinctively identifying the root note of each chord by color indicators together with light indications of only the other two notes of the triad, and wherein the indication is retained only during activation of the clavial switches. In contradistinction, this display activates all three notes of the triad in a single line of display and a single color to maintain a consistency of appearance throughout the scale, and additionally identifies the root note. Moreover, the indication is latched on until a different triad is called for, so that the nature of the change is dramatically evident.

DESCRIPTION OF ELECTRONIC CIRCUITRY

Figure 5:
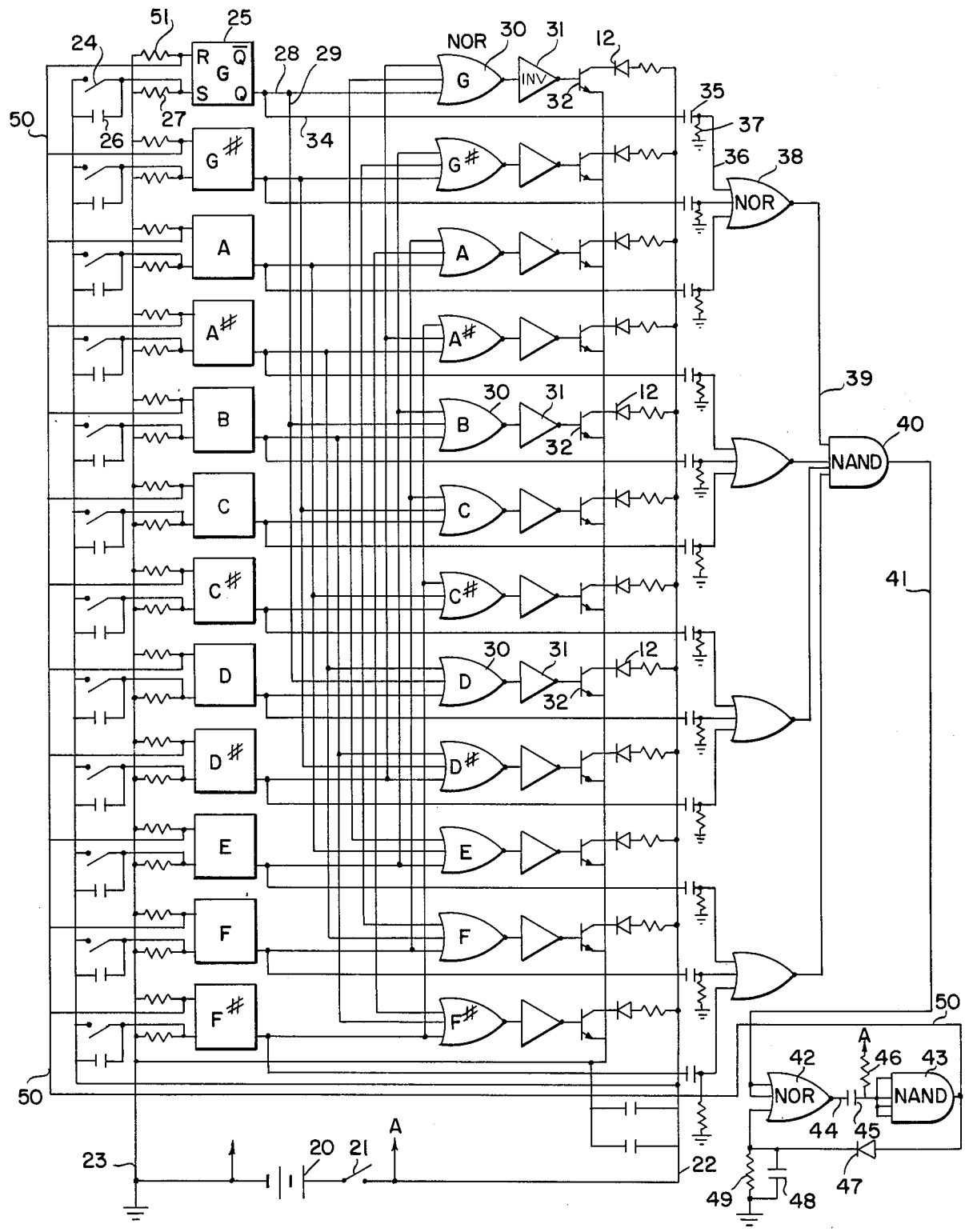
FIG. 5 is a schematic diagram of one form of the apparatus.

Referring to FIG. 5, electronic logic circuitry is shown schematically to include an energy source such as a battery 20 effective through an ON-OF switch 21 to energize a positive bus 22 relative to circuit ground 23. Each key sensing actuator 13 is effective upon depression of its respective key to provide a signal, as by closure of switch 24, the signal being conducted to the set input of flip-flop 25. This flip-flop is conventional design which, in a preferred embodiment, is one half of an RCA no. CD4013, Dual D-type flip-flop. A CD4013A is an integrated circuit consisting of two identical, independent type flip-flops, each having an independent, set, reset, and clock inputs and Q and $\overline{Q}$ outputs. In its use in this circuit as a static flip-flop, the and clock inputs are not used, hence are not shown for purposes of brevity and clarity. Application of the key closure signal to the set input of flip-flop 25 for the key of G triggers the corresponding flip-flop to provide a stable state output at Q. Upon subsequent opening of the key switch 24, the signal at the set input is bled to ground by the discharge of capacitor 26 through resistor 27. The output at Q terminal for the flip-flop 25 of the G key is applied through lead 28 and bus 29 to an input of NOR elements 30 for each of the chord triad notes G, B, and D. NOR element 30 may be part of an RCA type CD4025 digital integrated circuit, each said element comprising three inputs and effective to provide a low output when a signal is present at any one of its inputs. Thus, output signals present at NOR elements 30 for the keys G, B, and D are fed through respective inverting buffer amplifiers 31 and corresponding driving transistors 32 to chord triad identifier lights 12, which take the form of light emitting diodes. A prototype model utilizes an RCA type CD4049 or CD4009 COS/MOS Hex Buffer/Converter used as the inverter 31, a general purpose high current NPN transistor of type CA 308 monolithic silicon as LED driving transistors 32, and conventional HP 5082-4584 or similar LED as identifier lights 12.

At the same time that the signal derived from the Q output of flip-flop 25 for the key of B is applied to circuitry for activating the triad identifier lights 12 for the chord G, B and D in the aforedescribed manner, the signal is also applied via lead 34 through coupling capacitor 35 to one input 36 of NOR element 38, which also is of RCA type CD 4025. Resistor 37 acts with capacitor 35 to form a differentiating circuit which provides a leakage path to maintain the NOR input 36 at neutral to avoid voltage build up during periods between signal reception. The resultant momentary signal input at NOR element 38 is effective to switch the output 39 from a normal high to a low condition applied to an input of NAND gate 40, which may be of RCA type CD 4012. In the absence of a momentary signal pulse at 39, each input to NAND gate 40 is high, thus maintaining output 41 low. The application of the pulsed output of a NOR element 38 to any input of NAND gate 40 is thus effective to provide a momentary high signal at 41 which is applied to a monostable multivibrator circuit comprising NOR element 42 and NAND element 43 of conventional circuitry. Specifically, the momentary (pulsed) high signal at an input of NOR 42 effects a low pulse at 44 which is applied through coupling capacitor to commonly wired inputs of NAND gate 43, the inputs being maintained normally high by connection through resistor 46 to the high side of battery 20 through connections indicated A,A. By virtue of the commoned inputs to NAND element 43, the element functions as an inverter in which the output is always in the opposite logic state as the input. Hence, a low pulse at the commoned inputs provides a high pulse at the output which in turn is applied through commutating diode 47 to an input of NOR element 43 to hold its output at low. At the same time, capacitor 48 becomes charged and subsequently leaks off through resistor 49 to return the input of NOR element 42 to low. All inputs now being at low, the multivibrator returns to its original state.

The high pulse at the output of NAND element 43 is transmitted through conductor bus 50 to the reset input of all flip flops 25 simultaneously. Thus, the entire logic system is returned to the original logic state wherein all indicators 12 are OFF, and the system is set to repeat itself upon activation of a set input of either the same flip flop 25 (where a sequence of the same bass note-chord combination is to follow) or a different flip flip 25 (where there is a change in the bass note key which is depressed).

In the first instance, i.e., where the same bass note key has been depressed twice in succession, the fleeting momentary nature of the reset input pulse provided by NAND element 43 is outlasted by the relatively slow manipulative speed of a student, to the extent that key switch 24 for the same flip flop that had been previously set remains closed after the reset bus has returned to low by bleed off through resistor 51. Thus, the flip flop resets and again sets virtually instananeously, there being no discernible change in the illumination state of chord identifier lights 12. Effectively, i.e. insofar as is discernible at the speed of visual perception, this operation defeats the release of the latching means.

In the instance where the music calls for a change in the chord and consequently a root note key other than that of the flip-flop which previously was set is now depressed, the reset of the previously set flip flop 25 is effective to extinguish the chord triad identifiers controlled by that flip-flop, and the set of the newly selected flip-flop is effective to activate a corresponding triad of different identifiers 12.

The result is that the logic system will respond to a selected root note key to activate a given triad of chord identifier lights and will latch the given triad of lights in the illuminated state through any number of successive activations of the same root note key, but upon, and only upon the activation of a different root note key will it extinguish the latched triad of identifiers and activate a different triad which corresponds to the different root note key.

Figure 6:
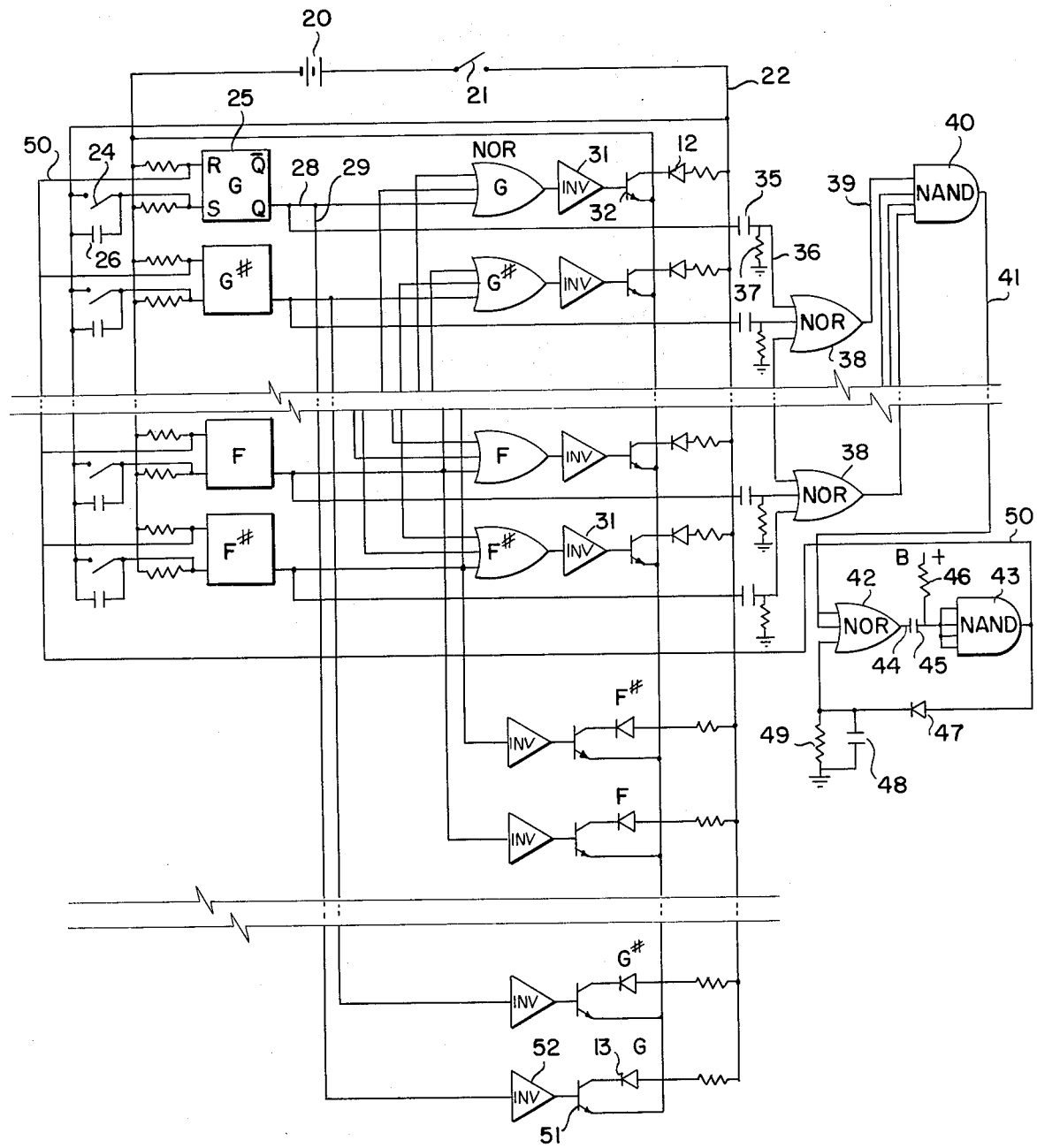
FIG. 6 is a schematic diagram of an alternative form of the apparatus.

FIG. 6 is a schematic of a logic system similar to that of FIG. 4 in major regards, but providing for the additional feature of root note confirmatory lights 13. In the interest of brevity, the schematic is broken to omit redundent circuitry of intermediate keys which functions in the same manner as that described herein. To this end, each root note is provided with a confirmatory indicator 13, which may be a light emitting diode of RCA type HP 5082–4684, each LED being driven in a fashion similar to indicators 12, namely a transistor driver 51 and an inverter 52. Each inverter 52 has its inputs connected to a corresponding bus 29, which bus is activated as in the manner of FIG. 4 by the output Q of flip-flop 25. Thus, root note confirmatory light 13 becomes illuminated upon the set condition of corresponding flip flop 25, and remains in the illuminated state until the flip flop is reset. Accordingly, there is provided a root note indicator driving circuit which acts independently of the triad indicator drive circuits to illuminated root note confirmatory indicators 12, and latches the appropriate root note indicator in the illuminated state until sensing the depression of a different root note key.

The aforedescribed logic circuitry is set forth in detail in order to present a fully enabling disclosure, the details thereof forming no part of this invention, the scope of which is to be determined by reference to the following claims.

I claim:

1. An apparatus for instruction in the playing of chords on a musical instrument including a keyboard, said apparatus comprising
mounting means positionable upon first and second octaves of the instrument keyboard, said mounting means including
sensing means responsive to the depression of keys of said first octave of said keyboard to derive a signal, display means including chord note identity indicators each of which is visually associated with a particular key of said second octave of said keyboard, said apparatus further comprising
means responsive to said signal derived from sensing a particular key to activate a certain plurality of said chord identity indicators, and
means effective to latch said plurality of chord identity indicators in said activated state.

2. The apparatus of claim 1 including means responsive to a subsequent said signal derived from sensing depression of a root note key of said first octave of said keyboard, said last named responsive means being effective to release said latch means.

3. The apparatus of claim 2 wherein said latch release means is effective only momentarily, and wherein said signal derived from said sensing means outlasts said momentary effectiveness of said latch release means, whereby a subsequent depression of the same said particular key effectively defeats release of said latch means.

4. The apparatus of claim 2 wherein said latch release means is effective only momentarily, and wherein said signal derived from said sensing means outlasts said momentary effectiveness of said latch release means, whereby a subsequent depression of a different key of said first octave releases said latch means and simultaneously activates and latches a different plurality of said chord identity indicators.

5. The apparatus of claim 1 including root note confirmatory indicators and means responsive to said signal responsive means to activate a respective one of said root note indicators throughout the period of the latched state of said latch means.

6. The apparatus of claim 2 including root note confirmatory indicators and means responsive to said signal responsive means to activate a respective one of said root note indicators throughout the period of the latched state of said latch means.

7. The apparatus of claim 3 including root note confirmatory indicators and means responsive to said signal responsive means to activate a respective one of said root note indicators throughout the period of the latched state of said latch means.

8. The apparatus of claim 4 including root note confirmatory indicators and means responsive to said signal responsive means to activate a respective one of said root note indicators throughout the period of the latched state of said latch means.

9. A system for instruction in the playing of chords on a musical instrument, said system including the apparatus of claim 1, and additionally including means to display to a student notations of music to be played in the instructional process, said notations comprising music written in conventional staff format and additionally including indicia identifying a root note key to be manipulated by the student and, in ordered relation to said root note indicia, symbols signifying the time at which intervening chord triads are to be sounded, said chord note identity indications of said apparatus correlating the time signifying symbols with the particular keys of the second octave of said keyboard which comprise the triad corresponding to said particular key of the first octave.

10. A visual aid for use in instruction in the fingering of chords on a keyboard musical instrument, said apparatus comprising a display panel including
a plurality of identical chord note identity indicator lights positioned in a sequence corresponding to the sequence of notes on a keyboard,
a plurality of root note indicator lights distinct from said chord note identity indicator lights, each said root note light positioned in visual association with the chord note indicator corresponding to the respective key,
indicia indicative of the finger to be used in playing the root note of a triad, said indicia associated, respectively, with the root note confirmatory indicators G through B, C through D, and E flat through F sharp,
said apparatus additionally including
means for activating at one time three of said chord note indicators identifying the notes of a given chord triad and one said root note light,
means effective to latch said activated chord note indicators and said activated root note indicator in the activated state, and
means responsive to activation of indicators for a chord triad different from that indicated by said latched indicators, said last named means effective to release said latch means.

* * * * *